United States Patent
Ballard

(10) Patent No.: US 6,712,747 B1
(45) Date of Patent: Mar. 30, 2004

(54) METHOD AND APPARATUS FOR CREASING PLANAR MATERIAL

(75) Inventor: Eugene M. Ballard, Arvada, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 3 days.

(21) Appl. No.: 10/049,387

(22) PCT Filed: Aug. 10, 2000

(86) PCT No.: PCT/US00/21811
§ 371 (c)(1),
(2), (4) Date: Feb. 11, 2002

(87) PCT Pub. No.: WO01/12424
PCT Pub. Date: Feb. 22, 2001

Related U.S. Application Data
(60) Provisional application No. 60/148,834, filed on Aug. 12, 1999.

(51) Int. Cl.[7] .................................................. B31F 1/00
(52) U.S. Cl. ........................... 493/406; 493/60; 493/81; 493/241; 493/250; 493/395; 493/424; 493/454
(58) Field of Search ............................ 493/81, 241, 60, 493/64, 66, 250, 395, 397, 424, 435, 442, 434, 454, 456; 83/875, 879, 171; 225/93.5

(56) References Cited

U.S. PATENT DOCUMENTS

| | | | | |
|---|---|---|---|---|
| 2,779,851 A | * | 1/1957 | Vogt | 219/384 |
| 3,819,465 A | * | 6/1974 | Parsons et al. | 428/176 |
| 4,221,373 A | | 9/1980 | Muller Hans | |
| 4,595,187 A | | 6/1986 | Bober | |
| 5,024,131 A | * | 6/1991 | Weidman | 83/875 |
| 5,567,504 A | * | 10/1996 | Schakel et al. | 428/167 |
| 6,296,469 B1 | * | 10/2001 | Suzuki | 425/290 |

* cited by examiner

Primary Examiner—Stephen F. Gerrity
Assistant Examiner—Hemant M. Desai
(74) Attorney, Agent, or Firm—Dorsey & Whitney LLP

(57) ABSTRACT

A method and apparatus for creasing planar material includes a pair of confronting drums between which the material is passed with at least one of the drums having at least one electrical filament thereon adapted to engage the planar material as it is passed between the drums for melting the planar material to a predetermined depth. The filaments are preferably quick heating and also dissipate heat quickly so that they can be activated and deactivated in short intervals so that the drums upon which the heat filaments are mounted do not heat up between the filaments.

10 Claims, 4 Drawing Sheets

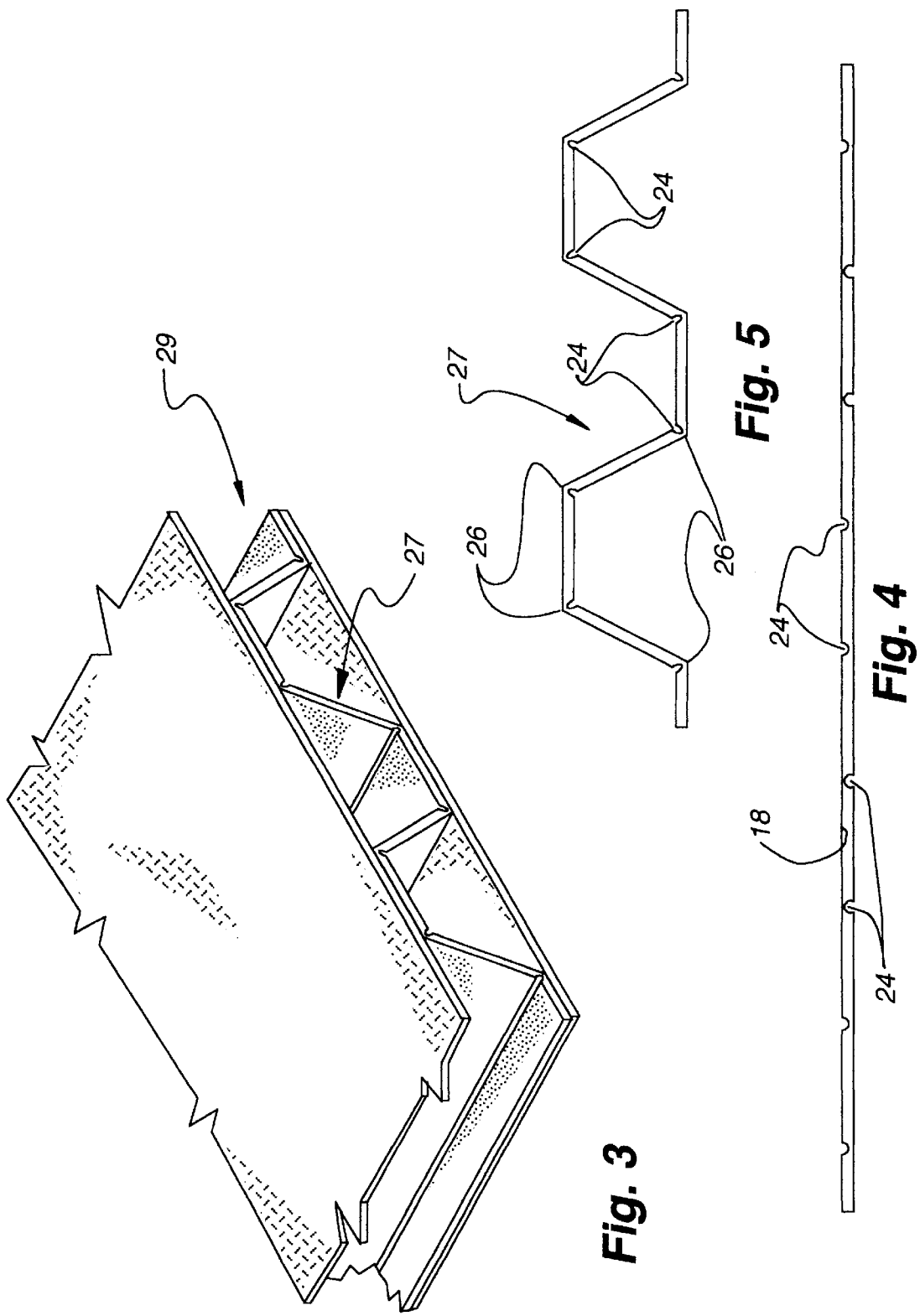

METHOD AND APPARATUS FOR CREASING PLANAR MATERIAL

CROSS-REFERENCE TO RELATED APPLICATION

This claims priority to Patent Cooperation Treaty Application No. PCTIUS00/21 811, filed Aug. 10, 2000, which application claims the benefit of priority to U.S. provisional patent application Ser. No. 60/148,834, filed Aug. 12, 1999. Each of the above-identified applications is hereby incorporated by reference as though fully disclosed herein.

BACKGROUND OF THE INVENTION

1. Field of the Invention

The present invention relates generally to methods and apparatus for creasing planar material and more particularly to a method and apparatus utilizing heated filaments to provide crease lines in planar material such as fiberglass-type sheets.

2. Description of the Relevant Art

Planar materials which are semi-rigid in construction can many times be folded along a predetermined line by providing a crease in the material along the designated fold line. Such fold lines are desirable in ceiling panels of the type described in copending provisional patent application Serial No. 60/148,834, filed Aug. 13, 1999 entitled "Ceiling System with Replaceable Panels," priority to which is claimed herein. The disclosure in the aforenoted application is also hereby incorporated by reference.

Ceilings of building structures have taken numerous forms. They may be left unfinished so that rafters or beams of the building structure itself are exposed or the rafter and beams may be covered as with drywall, wood strips, plaster or other similar finishes. Walls of building structures may be similarly finished.

Another popular ceiling system is commonly referred to as a drop ceiling where a plurality of support bars are suspended from the unfinished ceiling so as to form a matrix having a plurality of side-by-side openings defined between the support bars. The openings are filled with panels which are typically rigid acoustical panels, with the panels being supported along their peripheral edge by the support bars. Although such drop ceilings have met with some success, there are numerous disadvantages. One disadvantage is that there is very little variety in the aesthetics of the ceiling system since most acoustical panels have the same general appearance, with another disadvantage residing in the fact that the panels are rigid and brittle so that they are easily breakable and, further, due to their rigidity, they are difficult to insert into the opening provided therefore inasmuch as the support bars must partially protrude into the opening in order to provide a support surface for the panels. Panels overcoming the above shortcoming are described in the aforenoted provisional application and it will therein be appreciated that the panels are formed from flexible sheets of material, such as material having glass fibers embedded in resin, with some of the components of the panel being folded along predefined fold lines. It is difficult to fold such materials without first precreasing the material and accordingly an improved method and apparatus for providing creases in panels of this type would be desirable.

It is to overcome the shortcomings in prior art systems and to provide a new and improved method and apparatus for creasing planar sheets of material that the present invention has been made.

SUMMARY OF THE INVENTION

The present invention pertains to a new and improved system for cauterizing planar sheets of material to form creases therein along predetermined lines. In some planar sheets, such as sheets made of glass fibers embedded in resins, it is desirable to crease the material without damaging the glass fibers so that the material will remain resilient even after having been creased and folded along the crease line.

In accordance with the present invention, a pair of confronting and rotatable drums are mounted in slightly spaced relationship so that the planar material to be cauterized and creased can be passed therebetween. At least one of the drums includes at least one conductive filament or wire so that the wire can be heated to a temperature exceeding that which will cauterize the resin in a glass fiber panel.

In operation, the drums are rotated as the planar material is advanced therebetween and as the drums are rotated, the heated filament or filaments thereon engage the planar material at preselected locations to cauterize the material and thereby provide a crease in the material consistent with the size and configuration of the heated filament.

Other aspects, features, and details of the present invention can be more completed understood by reference to the following detailed description of the preferred embodiment, taken in conjunction with the drawings and from the appended claims.

BRIEF DESCRIPTION OF THE DRAWINGS

FIG. 2 is vertical section of a portion of the apparatus shown in FIG. 1, illustrating the confronting drums and the sheet of planar material passing there between.

FIG. 3 is a fragmentary isometric view of a panel formed with a sheet that has been creased and folded with the apparatus shown in FIG. 1.

FIG. 4 is a side elevation of a planar sheet of material having been creased with the apparatus of FIG. 1.

FIG. 5 is an end view of a folded sheet formed from a planar sheet of material that has been creased with the apparatus of the present invention and further showing a folding device for folding the creased material along the crease lines.

DESCRIPTION OF THE PREFERRED EMBODIMENT

Figure 1:
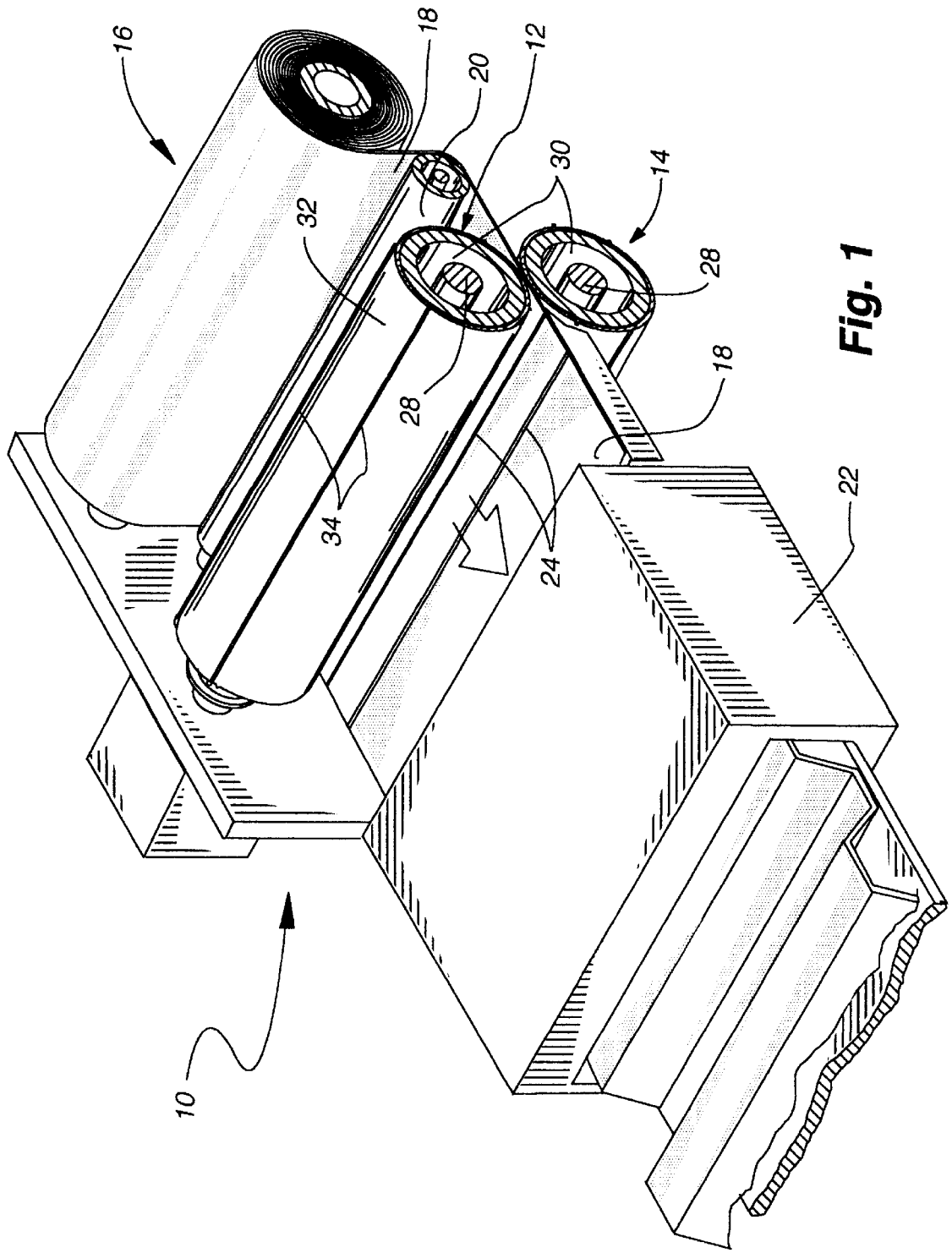
FIG. 1 is an isometric view of an apparatus for creasing planar sheets of material in accordance with the present invention.
Figure 2:
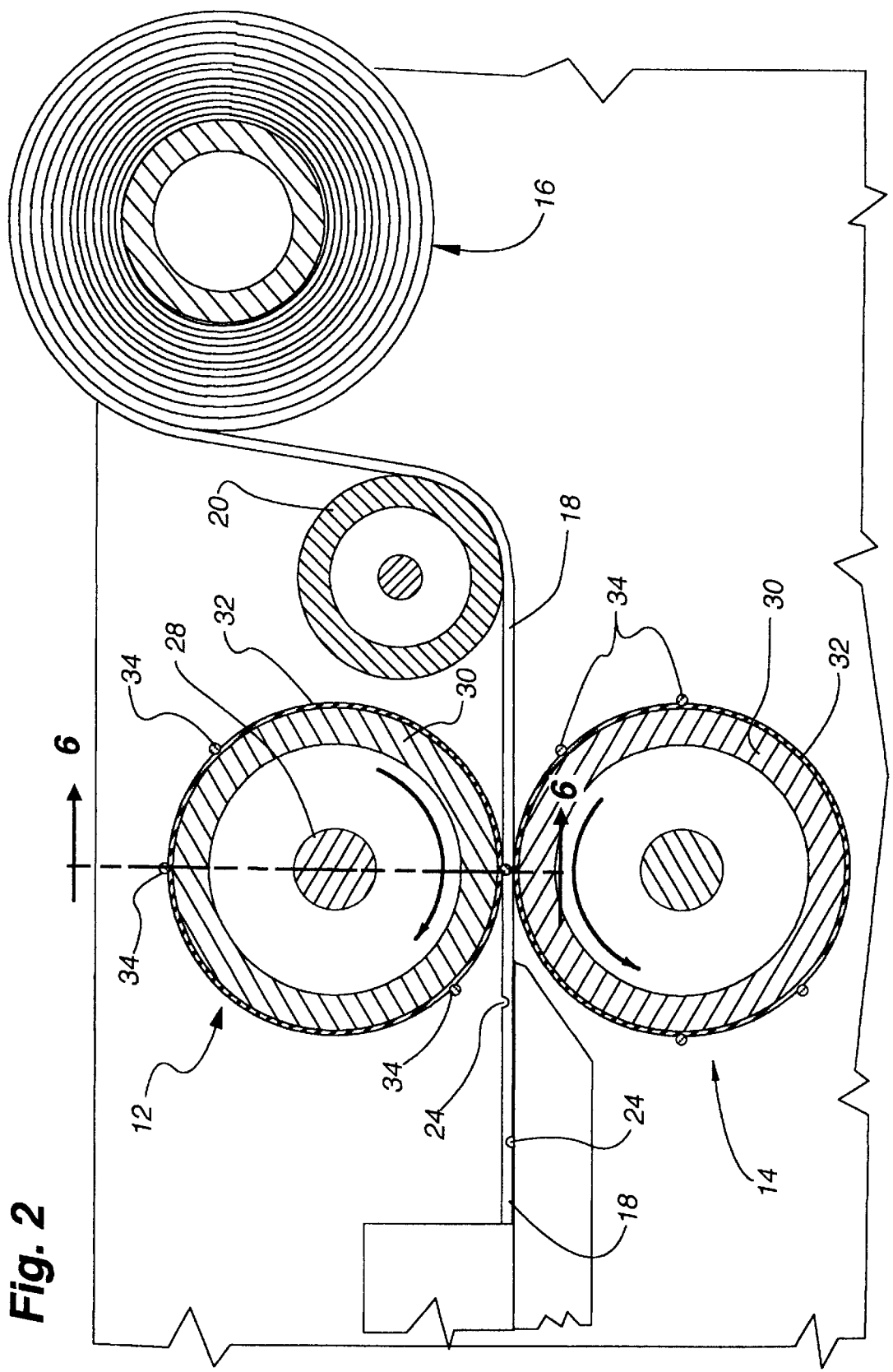

With reference to FIG. 1, an apparatus 10 in accordance with the present invention is illustrated. The apparatus includes a pair of confronting cylindrical drums 12 and 14, a supply roll 16 of planar sheet material 18 that passes around an idler roller 20 before being fed between the confronting drums and into a folding apparatus 22 for folding the cut and creased planar sheets of material 18 into products, for example, of the configuration shown in FIG. 5. As will be appreciated with the description that follows, the apparatus 10 can be modified to form various types of creases 24 in planar sheet material in accordance with desired fold lines 26 (FIG. 5) for forming products 27 of various configurations. The product illustrated in FIG. 5 is merely exemplary of a product that can be formed from a creased sheet of planar material, wherein the planar material has been cauterized to form the crease with the apparatus of the present invention. The product shown in FIG. 5 can be incorporated, for example, into a ceiling panel 29 as shown in FIG. 3 of the type described in more detail in the aforenoted provisional patent application.

The planar material 18 to be creased in accordance with the present invention may be provided in rolls or in flat sheets or strips such that the material can be advanced between the pair of confronting drums 12 and 14. The sheet or strips of material to be creased are precut to a predetermined width that can be accommodated by the length of the rollers.

A material found to be particularly suitable for cauterizing in forming crease lines with the method and apparatus of the present invention includes glass fibers imbedded in an acrylic resin with the fibers preferably being relatively long and thin. The length of the glass fibers would preferably be in the range of one quarter inch to one inch. The thickness of the glass fibers would preferably be in the range of seven microns to one-hundred microns, with fibers of ten to sixteen microns having proven to be particularly desirable. A material found suitable for this purpose is 100 GSM glass mat, number 8802 manufactured by Johns Manville of Waterville, Ohio; or an alternative would be materials from OJI Glasper in Japan and also Ahlstrom in Finland.

The drums 12 and 14 are disposed above and below the strips or sheets of material and mounted for rotation on axles 28. Both drums are formed from a metal cylinder 30 and have an outer electrically insulating covering 32. The covering or outer sleeve 32 may be made of silicon rubber which would preferably have a durometer rating of approximately 80. In the disclosed embodiment, the drums have a plurality of electrically conductive wires 34, such as nickel chromium, extending along their length with the wires being connected to an electrical source (not shown) so that they can be energized and de-energized in a short period of time whereby the wires function as quick heat filaments, but upon deactivation lose the heat very rapidly. The insulating sleeve insulates the metal drums from the nickel chromium wires so that the drums do not heat up between the wires. As the strip or sheet material 18 is passed between the drums, the nickel chromium wires 34 are engaged with the material at preselected intervals corresponding to the distance around the periphery of the cylindrical drum that the wires are positioned. The wires, of course, come into engagement with the material 18 along a line of alignment between the two cylindrical drums 12 and 14 which is within an imaginary plane passing through the longitudinal axes of the drums. The nickel chromium wires are energized immediately before engagement with the strip material to cauterize the crease position on the material and de-energized immediately thereafter for cooling the wires. In this manner, heat is applied to the material only along a line of engagement with the wire and only for a short period of time, but it is enough heat to cauterize the crease position on the substrate of the glass fiber/resin material without damaging the glass fibers themselves. In other words, the heat penetrates and cauterizes the resin but will not damage the glass fibers which have a higher melting point so that the structural integrity of the strip is left untouched. It will be appreciated that other composites could be used for the strip material with a preferred object being to utilize components with different melting temperatures so that one component is cauterized by the wires while another component is not.

It will be appreciated that if it were desired to crease only one side of the material 18, one of the upper or lower drums 12 or 14 would not be provided with the electrically conductive wires. It is also possible that ultrasonics or lasers could be used to crease the material again by cauterizing the resin base without damaging the glass fibers in the strip material. The creases are provided at locations where the strip or sheet material is to be folded and these locations are spaced from each other consistently with the spacing of the wires around the circumference of the cylindrical drums.

It will be appreciated that the wires need not necessarily run along the length of the drum on which they are mounted but could run perpendicularly thereto or even at an angle relative thereto depending upon the location and orientation of the crease desired for the strip or sheet material. In some such cases the wires may be continuously energized.

Figure 6:
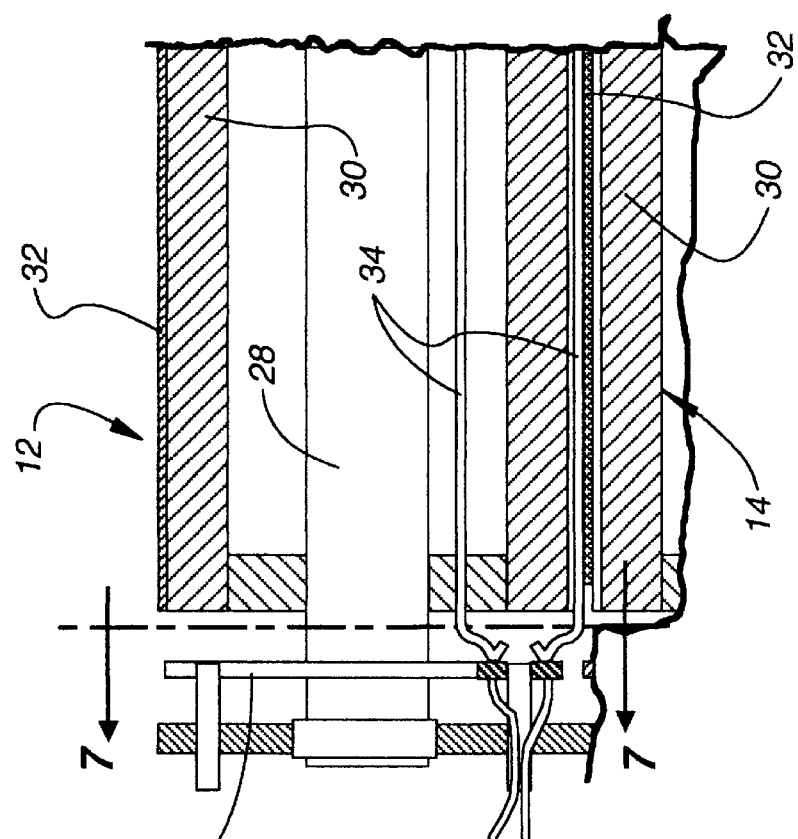
FIG. 6 is a fragmentary section taking along line 6—6 of FIG. 2.
Figure 7:
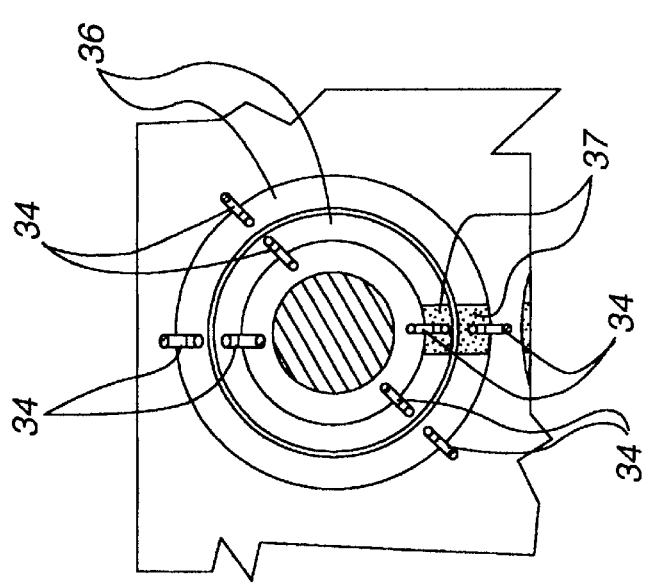
FIG. 7 is a fragmentary section taking along line 7—7 of FIG. 6.

With reference to FIGS. 6 and 7, it will be seen that a plurality of wires 34, which are each elongated loops, running along the length of the drums, are in engagement with non-conductive rings 36 having conductive pads 37 at a location adjacent to the line of alignment between the two drums. The rings are positioned at one end of the drums 12 and 14 with the rings being in engagement with conductive brushes 38 at each end of the looped wires. The conductive pads 37 on the rings are in turn connected to a source of electricity through an appropriate switching system 38 which selectively controls the flow of electricity to the pads 37. The wires are thereby energized and de-energized in pulses as they are rotated by the line of alignment between the drums and come into engagement with the planar material.

It will also be appreciated that the depth of the crease provided in the sheet or strip material 18 can be regulated by the diameter of the wire 34 or the spacing of the drums 12 and 14. While it is preferable that the drums both be driven at a uniform speed but in opposite directions, i.e., clockwise and counterclockwise, it is possible that one of the drums could be an idler while the other is driven or if there is enough frictional engagement between the sheet or strip material and the drums, the sheet or strip material could simply be drawn between the drums and both drums could be idler drums which are forced to rotate uniformly through frictional engagement with the sheet or strip material which is being pulled therebetween.

Although the present invention has been described with a certain degree of particularity, it is understood that the present disclosure has been made by way of example, and changes in detail or structure may be made without departing from the spirit of the invention as defined in the appended claims.

What is claimed is:

1. An apparatus for creasing a planar material of a predetermined thickness comprising in combination:
  a means for creasing a planar material without completely penetrating through the predetermined thickness of the planar material, and
  a means for connecting the means for creasing without completely penetrating through the predetermined thickness of the planar material to a source of electricity.

2. The apparatus of claim 1 further including means for selectively controlling the flow of electricity.

3. The apparatus of claim 1 wherein said means for creasing without completely penetrating through the predetermined thickness of the planar material comprises a
  pair of confronting drums having parallel axis of rotation and cylindrical surfaces, said cylindrical surfaces comprising an electrically insulating material.

4. The apparatus of claim 3 wherein said drums have a metal main body on which said insulating material is disposed.

5. The apparatus of claim 3 wherein at least one said drums comprises at least one electrically conductive filament, said at least one electrically conductive filament extends in parallel relationship to said axis of rotation of the drums.

6. The apparatus of claim 1 wherein said cylindrical surfaces are an outer surface of said drums.

7. A method of creasing without completely penetrating a planar material comprising the steps of:

provides a pair of confronting cylindrical drums having parallel axes of rotation with said drums defining a passage therebetween for said planar material to pass, wherein at least one of said drums has at least one electrically conductive filament on its cylindrical surface, passing said planar material through said passage while said drums are counter-rotating so as to engage said at least one filament with said planar material, providing an electrical current to said at least one filament, and cauterizing without completely penetrating said material with said electrified filament to form a crease therein.

8. The method of claim 7 wherein said electrical current is provided to said at least one filament in predetermined pulses.

9. The method of claim 7 further including the step of providing said drums with a surface of an electrically insulating material.

10. The method of claim 7 wherein said material is a glass fiber material impregnated with resin and further including the step of melting the resin material during the cauterizing step without damaging the glass fibers.

* * * * *